United States Patent

[11] 3,596,915

| [72] | Inventor | Edward A. Snidar<br>Whitmore Lake, Mich. |
|---|---|---|
| [21] | Appl. No. | 282 |
| [22] | Filed | Jan. 2, 1970 |
| [45] | Patented | Aug. 3, 1971 |
| [73] | Assignee | O & S Bearing & Mfg. Co.<br>Whitmore Lake, Mich. |

[54] DUST SEAL FOR BALL JOINTS
12 Claims, 5 Drawing Figs.

[52] U.S. Cl. .................................................. 277/212 FB,
  287/90 R
[51] Int. Cl. ...................................................... F16j 3/00
[50] Field of Search ........................................... 277/212,
  212 FB; 287/88, 90 R, 90 D, 90 B, 90 C

[56] References Cited
UNITED STATES PATENTS

| 3,279,832 | 10/1966 | Bergman | 277/212 FB |
| 3,404,909 | 10/1968 | Gottschald | 277/212 FB |
| 3,451,700 | 6/1969 | Smith | 277/212 FB |
| 3,472,540 | 10/1969 | Gottschald | 277/212 FB |

Primary Examiner—Robert I. Smith
Attorney—Barnes, Kisselle, Raisch & Choate

ABSTRACT: A dust seal for ball joint assembles of a type commonly used in motor vehicle steering linkages having external and internal ribs and primary and secondary sealing lips to prevent the dust seal from becoming damaged by entrapment between the ball stud member and the body of a joint assembly and to improve the sealing properties of effectiveness of the structure.

Patented Aug. 3, 1971
3,596,915
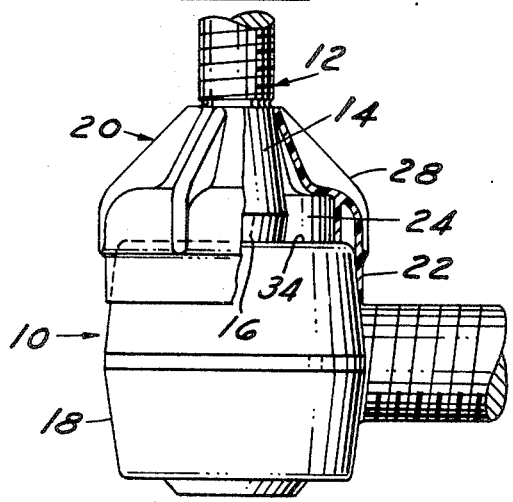
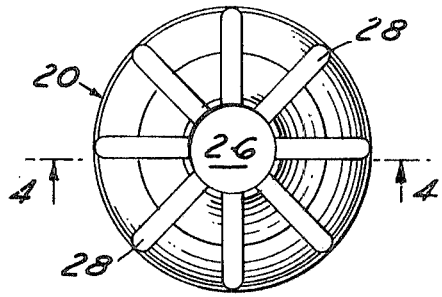
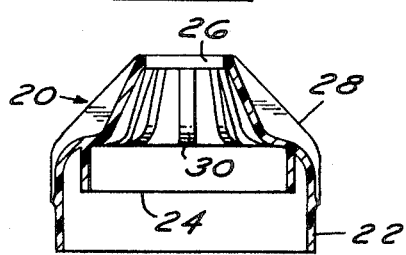
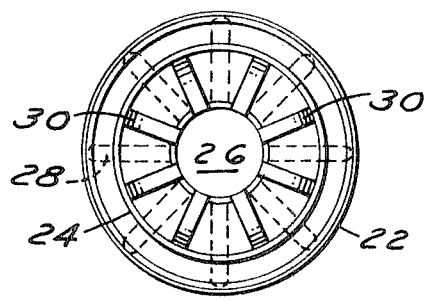
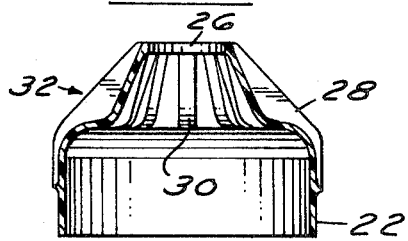
INVENTOR
EDWARD A. SNIDAR
BY
Barnes, Kisselle, Raisch & Choate
ATTORNEYS

DUST SEAL FOR BALL JOINTS

DESCRIPTION OF THE INVENTION

This invention relates to improvements in dust seals for ball joint assemblies of the type commonly used in vehicle front suspension steering linkages. This invention relates to improvements in the dust seal itself, not in the ball joint assembly which is old in the art. Dust seals for ball joint assemblies are known to the art and a flexible dust seal having external ribs for improving the sealing properties or effectiveness of the structure is shown in Smith Ser. No. 705,135, now U.S. Pat. No. 3,451,700, dated June 24, 1969. A problem with flexible dust seals is that they become damaged by collapsing into the open area around the tie rod socket and by being pinched between the ball stud member and the body of the joint assembly when the stud member is moved nearly as far as it can be or to an extreme position with respect to the body. Extreme movement of the stud member with respect to the body also causes the dust seal to separate from the body and lose its effectiveness or ability to effectuate a seal between the stud member and the body.

An object of this invention is to provide a dust seal which will not be damaged by movement of a ball stud member of a ball joint assembly on which it is utilized to an extreme position with respect to the body of the assembly.

Another object of this invention is to provide a dust seal structure which effectuates a seal even when a ball stud member of a joint assembly on which it is utilized is moved to an extreme position with respect to the body of the assembly.

These and other objects, features and advantages of this invention will be apparent from the following description and drawings setting forth the best mode contemplated by the inventor of making, using and carrying out this invention in which:

FIG. 1 is a fragmentary side elevational view partially in section showing the dust seal of this invention assembled to a ball joint.

FIG. 2 is a top plan view of the dust seal of this invention.

FIG. 3 is a bottom plan view of the dust seal of this invention illustrating the spacing of the internal ribs with respect to the external ribs.

FIG. 4 is a sectional view on line 4—4 of FIG. 2 illustrating primary and secondary sealing skirts.

FIG. 5 is a sectional side elevational view of a modified form of the dust seal structure of this invention.

REFERRING TO THE DRAWINGS

FIG. 1 illustrates a ball joint assembly 10 of standard construction with a ball stud member 12 having tapered surfaces 14 and 16 retained within a body member 18. A dust seal designated generally as 20 is assembled to a joint assembly 10 and is made of a flexible, preferably oil resistant rubber material such as polyurethane, Texin 480A, or a similar flexible oil and weather resistant material with a low coefficient of friction, low set, high resistance to abrasion and good flexure strength.

Dust seal 20 as shown in FIGS. 1 through 4 is in the general configuration of an inverted cup or a hemisphere with a substantially equatorial opening having a first skirt or lip 22 providing a primary sealing surface, a secondary skirt or lip 24 providing a secondary sealing surface, and a smaller stud opening 26 in polar relationship to skirt 22. Dust seal 20 has integral external ribs 28 peripherally spaced on lines of longitude relative to the polar opening 26 in such a manner that they bias sealing skirt 22 radially inward into firm engagement with body 18 of assembly 10. This radially inward biasing of skirt 22 into sealing engagement with body 18 which eliminates the need for an external clamp to secure dust seal 22 to body 18 is explained in greater detail in application Ser. No. 705,135, now Pat. No. 3,451,700, dated June 24, 1969, the specification of which is incorporated herein by reference.

Preferably, external ribs 28 extend substantially from stud opening 26 to the polar opening at skirt 22. Dust seal 20 also has integral ribs 30 preferably peripherally spaced between external ribs 28 on lines of longitude relative to polar opening 26 and preferably extending from opening 26 to the upper edge of integral internal skirt 24.

FIG. 5 illustrates a modified form of dust seal 20 designated generally as 32 which is similar to dust seal 20 except that it does not have an internal lip 24. Dust seal 32 has a generally hemispherical configuration with an equatorial opening having a sealing skirt 22, a polar opening 26, and peripherally spaced longitudinally extending integral external ribs 28 and internal ribs 30. Preferably, internal ribs 30 extend substantially from opening 26 to approximately halfway between the polar and equatorial openings.

In its operational environment either form 20 or 32 of the dust seal is positioned on a ball joint so that a sealing surface of skirt 22 and opening 26 are biased toward their respective mating surfaces on the body and ball stud member of the joint assembly. The resiliency of the material forming the dust seal and the peripherally spaced external ribs urge the sealing surfaces into firm engagement with the joint assembly 10, thereby sealing and protecting the ball joint from contamination. In both forms of the dust seal internal ribs 26 and in the form 20 also internal skirt 24 restrains the central portion of the dust seal from collapsing into the open area between the ball stud and the body when the ball stud is displaced or moved from the central or normal position. If a dust seal collapsed into this area, it would become pinched or caught between the ball stud member and the body when the ball stud moved to an extreme or high angle position with respect to the body. Repeated pinching or catching of a portion of the dust seal will cause it to wear or rupture and hence the internal ribs and internal skirt prevent the seal from being damaged by the pinching action of the ball joint. Collapsing of the central portion of the seal into the open area of the tie rod socket also causes portions of skirt 22 to separate from body 10 and thereby momentarily decrease the effectiveness of the seal. Hence the ribs 30 or internal skirt 24 or both also increase the dust seal's ability to protect the ball joint assembly from contamination. When a ball joint moves to an extreme or high angle position with respect to the body, there is a tendency for a portion of the sealing surface of skirt 22 to momentarily become disengaged from its mating surface on the body of the joint which would impair the effectiveness of the dust seal. To assure that the effectiveness of the seal is not impaired even when a ball stud is moved to an extreme or high angle position, the lower edge or bottom of internal skirt 24 engages with the upper or top end surface 34 of body 18 of the ball joint assembly to provide an effective secondary seal.

What I claim as new is as follows:

1. A device for sealing the stud end of a ball joint assembly having a ball stud member and a body member which comprises, a substantially hollow hemispherical sealing member of a flexible resilient material having a large opening substantially at an equatorial position on the hemispherical member to engage a side surface of the body member, a smaller stud opening at a polar location relative to the equatorial opening to engage with a surface of the ball stud member, and a generally annular axially depending internal integral skirt to bear on an end surface of the body member adjacent to said side surface of the body member.

2. A device for sealing the stud end of a ball joint assembly as defined in claim 1 which also comprises a plurality of solid-spaced integral external ribs extending radially outward from and longitudinally on at least a portion of the exterior surface of the hemispherical member.

3. A device for sealing the stud end of a ball joint assembly as defined in claim 2 in which said external ribs extend substantially from the stud opening to the equatorial opening.

4. A device for sealing the stud end of a ball joint assembly as defined in claim 2 which also comprises a plurality of solid-spaced integral internal ribs extending radially inward from and longitudinally on at least a portion of the interior surface of the hemispherical member.

5. A device for sealing the stud end of a ball joint assembly as defined in claim 4 in which said external ribs extend substantially from said polar opening to said equatorial opening and in which said internal ribs extend substantially from said polar opening to said skirt.

6. A device for sealing the stud end of a ball joint assembly as defined in claim 5 in which said internal ribs are circumferentially spaced such that they are interposed between said spaced external ribs.

7. A device for sealing the stud end of a ball joint assembly as defined in claim 1 which also comprises a plurality of solid-spaced integral internal ribs extending radially inward from and longitudinally on at least a portion of the interior surface of the hemispherical member.

8. A device for sealing the stud end of a ball joint assembly as defined in claim 7 in which said internal ribs extend substantially from the polar opening to said skirt.

9. A device for sealing the stud end of a ball joint assembly having a ball stud member and a body member which comprises, a substantially hollow hemispherical sealing member of a flexible resilient material having a large opening substantially at an equatorial position on the hemispherical member to engage a side surface of the body member, a smaller stud opening at a polar location relative to the equatorial opening to engage a surface of the ball stud member, plurality of solid-spaced integral external ribs extending radially outward from and longitudinally on the exterior surface of said hemispherical member, and a plurality of solid-spaced integral internal ribs extending radially inward from and longitudinally on the interior surface of said hemispherical member.

10. A device for sealing the stud end of a ball joint assembly as defined in claim 9 in which said external ribs extend longitudinally substantially from said polar opening to said equatorial opening and in which said internal ribs extend longitudinally substantially from said polar opening to approximately halfway between said polar and equatorial opening.

11. A device for sealing the stud end of a ball joint assembly as defined in claim 10 in which said internal ribs are circumferentially spaced so that they are interposed between said external ribs.

12. A device for sealing the stud end of a ball joint assembly as defined in claim 9 in which said internal ribs are circumferentially spaced so that they are interposed between said external ribs.